United States Patent [19]

Sado

[11] Patent Number: 5,209,321
[45] Date of Patent: May 11, 1993

[54] POWER TRANSMISSION APPARATUS

[75] Inventor: Hideki Sado, Zama, Japan

[73] Assignee: Nissan Motor Co., Ltd., Yokohama, Japan

[21] Appl. No.: 696,574

[22] Filed: May 8, 1991

[30] Foreign Application Priority Data

May 10, 1990 [JP] Japan .................................. 2-120335

[51] Int. Cl.$^5$ .......................................... B60K 17/348
[52] U.S. Cl. ..................................... 180/248; 74/467; 475/160
[58] Field of Search ............... 180/248, 245, 247, 378, 180/148; 74/467, 606 R; 475/160, 159

[56] References Cited

U.S. PATENT DOCUMENTS

| | | | |
|---|---|---|---|
| 2,015,108 | 9/1935 | Harper | 475/160 |
| 4,508,190 | 4/1985 | Uchiyama | 180/247 |
| 4,651,847 | 3/1987 | Hermanns | 180/245 |
| 4,726,254 | 2/1988 | Kubo et al. | 180/248 |
| 4,738,152 | 4/1988 | Takimura et al. | 180/247 |
| 5,041,068 | 8/1991 | Kobayashi | 180/248 |
| 5,064,017 | 11/1991 | Kikuchi | 180/248 |
| 5,143,168 | 9/1992 | Sagara | 180/248 |

FOREIGN PATENT DOCUMENTS 63-305032 12/1988 Japan .

Primary Examiner—Margaret A. Focarino
Assistant Examiner—A. M. Boehler
Attorney, Agent, or Firm—Foley & Lardner

[57] ABSTRACT

The power transmission apparatus comprises a center differential gear, a first inner front wheel drive hub connected to the center differential gear, a second outer rear wheel drive hub also connected to the center differential gear coaxially with the first hub, a ring gear fixed to the second hub, a pinion gear coupled to a propeller shaft and in mesh with the ring gear at a gearing position above the axis of the ring gear, and in particular a lubrication structure including a rotary cover member fixed to the second hub and formed with plural oil stirring projections, an oil sump formed in an inner surface of an apparatus housing, and an oil passage formed in a pinion gear housing. Since the pinion gear is offset upward away from the axial height of the ring gear and further sufficiently lubricated by the lubrication structure, it is possible to dispose a steering rack under the pinion gear housing to improve the steering stability, by always keeping the front wheel alignment at toe-in state under any travelling conditions of a 4WD vehicle.

7 Claims, 4 Drawing Sheets

POWER TRANSMISSION APPARATUS

BACKGROUND OF THE INVENTION

1. Field of the Invention

The present invention relates to a power transmission apparatus and more specifically to a lubrication structure of a power transmission apparatus for a four-wheel drive vehicle.

2. Description of the Prior Art

In the steering apparatus for automotive vehicles, generally it is possible to improve the stability of the steering operation by always keeping the two front wheel alignment at a toe-in state under any vehicle travelling condition. Here, the toe-in of front wheels implies that each of the two front wheels is inclined inside at the front and outside at the back when the two front wheels are seen from above. To always keep the front wheels at the toe-in condition, irrespective of vehicle bound or rebound conditions, it is necessary to locate a steering rack as low as possible to such a position where a steering linkage becomes flush with a steering knuckle.

In the case of a four-wheel drive vehicle, however, since a transfer case is provided, it is rather difficult to locate the steering rack at a lower position. In more detail, an example of prior-art power transmission apparatus incorporated in a four wheel drive (4WD) vehicle is disclosed in Japanese published Unexamined (Kokai) Patent Appli. No. 63-305032 as shown in FIG. 1. In the drawing, the power transmission apparatus is roughly composed of a center differential gear CD for distributing engine power to front wheels and rear wheels, a front differential gear FD for distributing engine power to right and left front wheels, a viscous coupling VC provided between a power transmit gear PG, and a casing CA of the front differential gear FD.

When an engine is disposed on the vehicle front side, a rotary direction change gear assembly is necessary to convert engine rotative power about a transversal front wheel drive shaft to that about a longitudinal propeller shaft. In the case of the power transmission apparatus shown in FIG. 1, the rotary direction change gear assembly DCG is composed of an intermediate shaft IS, a spur gear SG formed integral with the intermediate shaft IS and in mesh with the power transmit gear PG, a first bevel gear BG1 fixed to the intermediate shaft IS, and a second bevel gear BG2 connected to a propeller shaft and in mesh with the first bevel gear BG1. In the prior-art structure, since the rotary direction change gear assembly DCG is located on the rear side from the front wheel drive shaft, there exist problems in that the size of the power transmission apparatus increases and further the number of parts thereof also increases. In addition, there exists another problem in that it is impossible to locate the steering rack at the lower position because the rotary direction change gear assembly DCG inevitably interferes with the steering rack. Conventionally, therefore, in the case of 4WD vehicles, the steering rack is usually located over the rotary direction change gear assembly DCG, so that the front wheel alignment is not always kept at toe-in state when the vehicle is bounded or rebounded and therefore the steering stability is degraded.

To overcome the above-mentioned problem, it is possible to reverse the above arrangement so that the rotary direction change gear assembly is on the upper side and the steering rack is on the lower side. In this case, however, since the rotary direction change gear assembly is arranged on the upper side and therefore the bearing portion of the gear assembly is inevitably located above the lubricant tank, there exists a problem in that it is impossible to sufficiently lubricate the bearing portion of the gear assembly.

On the other hand, when a large amount of lubricant is reserved so that the bearing portion can be sufficiently immersed in the lubricating oil, the stirring resistance of the lubricant increases markedly, and there exists another problem in that power loss increases.

SUMMARY OF THE INVENTION

With these problems in mind therefore, it is the object of the present invention to provide a power transmission apparatus for automotive vehicles which can sufficiently lubricate the rotary direction change gear assembly located on the upper side of the steering rack, without increasing the lubricant stirring resistance.

To achieve the above-mentioned object, the power transmission apparatus according to the present invention comprises: (a) an apparatus housing (12a); (b) a first drive hub (30) extending in a first direction; (c) a second drive hub (32) disposed coaxially with said first drive hub; (d) a center differential gear (26) for differentially distributing power to said first and second hubs, respectively; (e) a drive shaft (46a) extending in a second direction perpendicular to the first direction; (f) a rotary direction change mechanism (38, 46) arranged offset from an axis of said first and second drive hubs, for changing a rotative direction along said first and second hubs to another rotative direction along said drive shaft; and (g) lubricating means (60, 62, 64) for supplying lubricant accumulated at a bottom of the apparatus housing to said rotary direction change mechanism arranged offset from the axis of said first and second drive hubs.

The lubricating means comprises: (a) a rotary cover member (40) coupled to any one of said first and second drive hubs and formed with at least one oil stirring portion (60) for stirring lubricant accumulated at the apparatus housing bottom; (b) an oil sump (62) formed inside the apparatus housing (12a) for accumulating lubricant stirred by said oil stirring portion of said rotary cover member; (c) an oil passage (64) formed in a drive shaft housing (52) for said drive shaft and communicating with said oil sump, for supplying lubricant accumulated on said oil sump to said rotary direction change mechanism. Further, the rotary direction change mechanism comprises: (a) a ring gear (38) fixed to any one of said first and second drive hubs; and (b) a pinion gear (46) coupled to said drive shaft and in mesh with said ring gear through skew bevel gear teeth. The oil stirring portion (60) is a projection radially extending from said rotary cover member (40) in slidable contact with the inner surface of said apparatus housing.

In the power transmission apparatus for automotive vehicles according to the present invention, since the rotary direction change mechanism is located being offset upward away from the axial height of the transversal front wheel drive shaft and additionally the lubricating means including the oil stirrer, the oil sump and the oil passage is provided, it is possible to arrange the rotary direction change mechanism at the upper position and the steering rack at the lower position, while providing sufficient lubrication in spite of a small amount of lubricant, for providing an excellent steering stability to a 4WD vehicle, in particular.

DETAILED DESCRIPTION OF THE PREFERRED EMBODIMENTS

An embodiment of the present invention will be described hereinbelow with reference to the attached drawings. The gist of the present invention is to arrange a rotary direction change gear assembly above the axis of the transversal front wheel drive shaft in such a way that a pinion gear coupled to a propeller shaft is offset away from the axis of a ring gear, and additionally to provide lubricating means including an oil stirrer, an oil sump and an oil passage in such a way that the rotary direction change gear assembly which is located in the upward position can be sufficiently lubricated.

Figure 1:
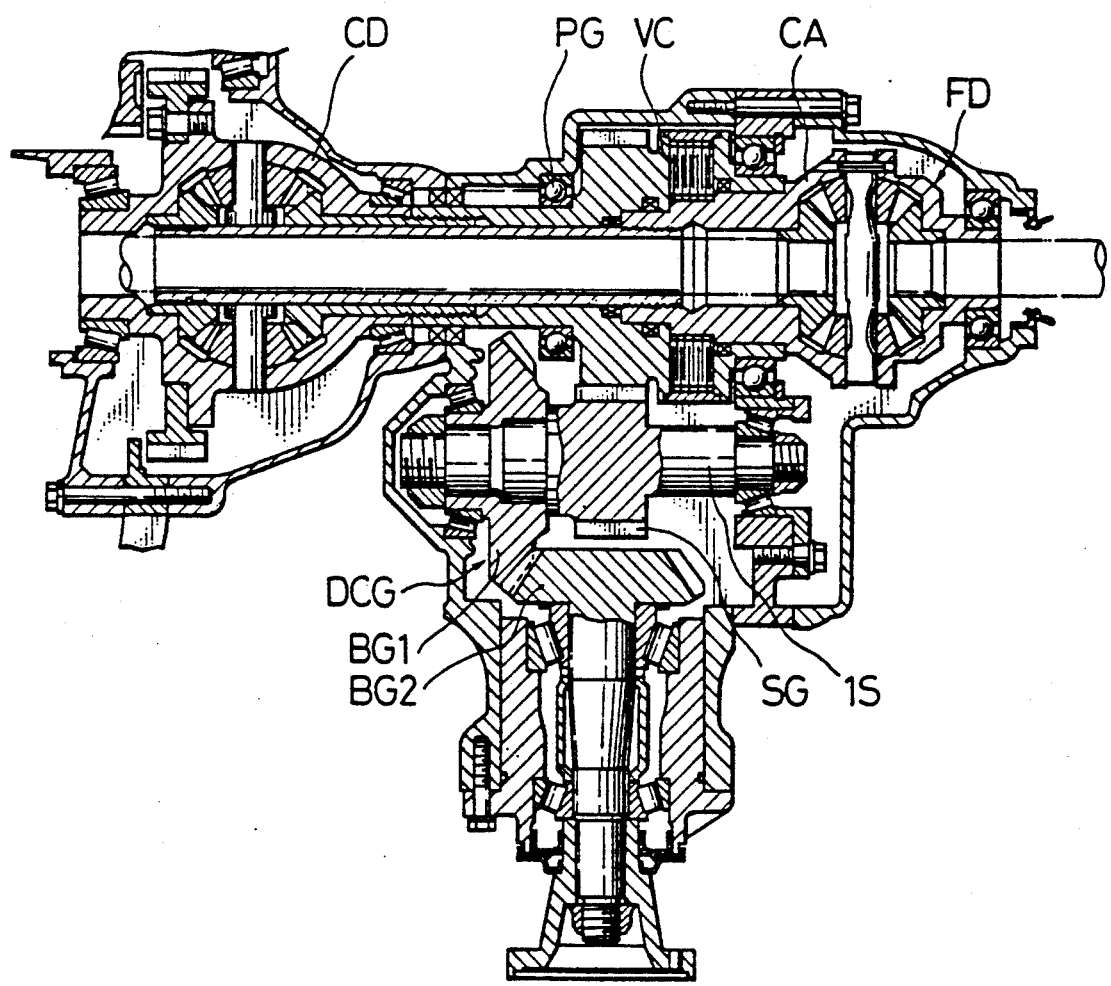
FIG. 1 is a cross-sectional view showing an example of prior-art power transmission apparatus.
Figure 2:
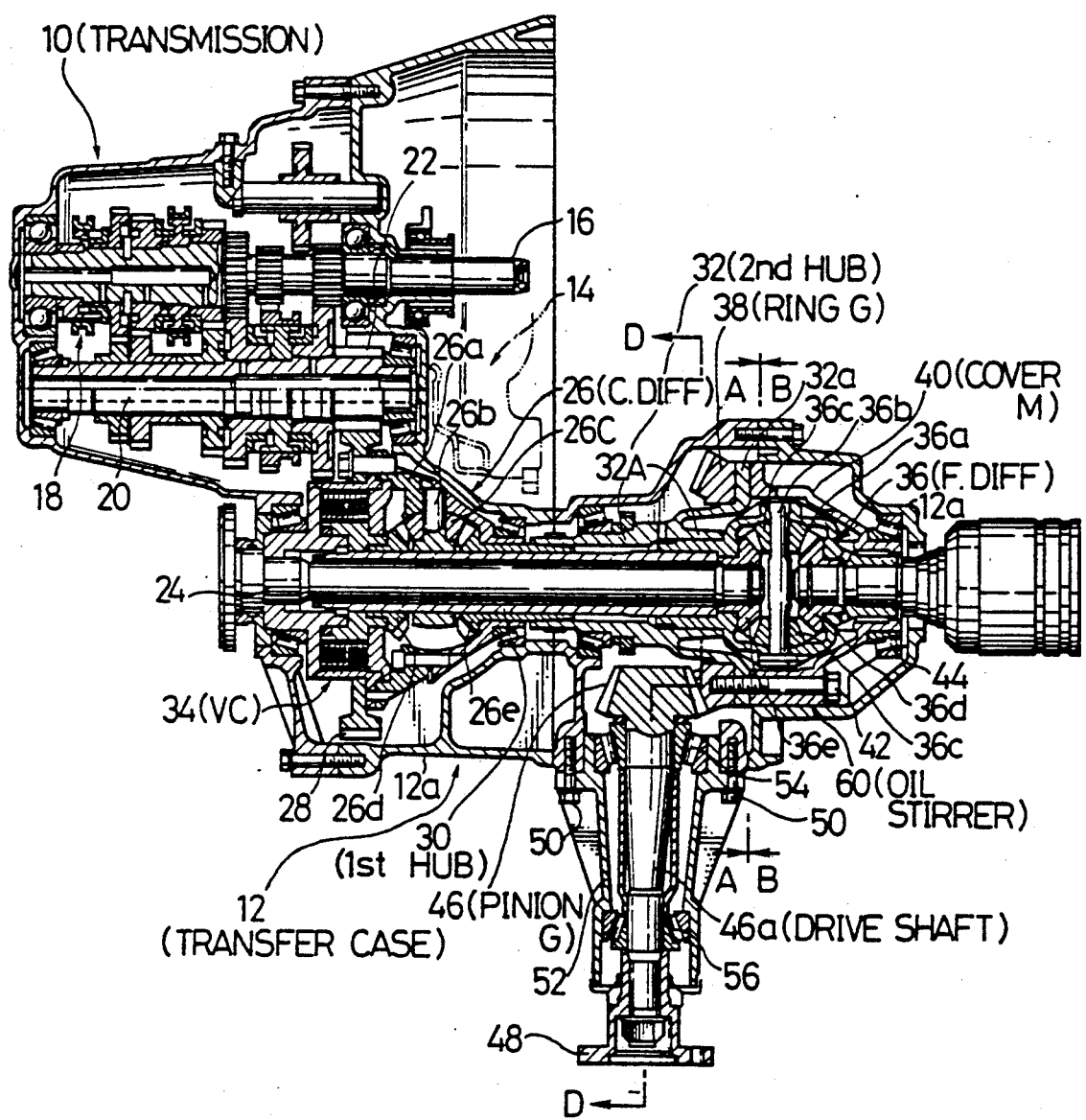
FIG. 2 is a cross-sectional view showing an embodiment of the power transmission apparatus according to the present invention, in which the transmission and the transfer case are shown in development condition on the same plane.

In FIG. 2, power of an engine (not shown) disposed on the right and upper position is given to a transmission 10 via a clutch 14, and then transmitted to a transfer case 12. In more detail, engine power supplied to an input shaft 16 is speed-changed via a speed change gear assembly 18, transmitted to an output shaft 20, and then outputted to the transfer case 12 via an output gear 22. The transfer case 12 is disposed coaxially with a front wheel drive shaft 24, and is composed of a center differential gear 26 for distributing engine power to front wheels and rear wheels, a front differential gear 36 for distributing engine power to front right and left wheels, a viscous coupling 34 for limiting differential motion of the front differential gear 36, and a rotary direction change gear assembly having a ring gear 38 and a pinion gear 46, and a front differential cover member 40 formed with an oil stirring portion 60. The center differential gear 26 is composed of a differential case 26a; a ring gear 28 fixed to the differential casing 26a and in mesh with the output gear 22; pinion mate shafts 26b fixed to the differential case 26a; pinion mate gears 26c rotatably supported by the pinion mate shafts 26b, respectively; and a pair of opposing side gears 26d and 26e arranged perpendicular to the pinion mate shafts 26b and in mesh with the pinion mate gears 26c, respectively.

The side gear 26d is used to drive a front wheel drive shaft. That is, the inner circumference of the side gear 26d is spline-engaged with the outer circumference of an inner front wheel (first) drive hub 30. On the other hand, the side gear 26e is used to drive a rear wheel drive shaft. That is, the outer circumference of a boss portion of the side gear 26e is spline-engaged with the inner circumference of an outer rear wheel (second) drive hub 32 rotatably supported by the inner front wheel drive hub 30. Further, a viscous coupling 34 is provided between a differential case 26a and the inner front wheel drive hub 30 to limit the differential motion of the front wheels relative to the rear wheels.

A front differential gear 36 for differentially distributing power to the right and left front wheels is provided between two opposing inside end surface portions of two right and left wheel drive shafts 24. The front differential gear 36 is composed of the differential case 36a; pinion mate shafts 36b fixed to the differential case 36a; pinion mate gears 36c rotatably supported by the pinion mate shafts 36b, respectively; and a pair of opposing side gears 36d and 36e arranged perpendicular to the pinion mate shafts 36b and in mesh with the pinion mate gears 36c, respectively. The side gear 36d is used to drive the right front wheel drive shaft, and the side gear 36e is used to drive the left front wheel drive shaft.

The inner circumference of the differential case 36a of the front differential gear 36 is spline-engaged with the outer circumference of the inner front wheel drive hub 30, so that the front differential gear 36 is driven by the inner front wheel drive hub 30 spline-engaged with the side gear 26d of the center differential gear 26.

On the other hand, an inner circumference of the rightward portion 32A of the outer rear wheel drive hub 32 is rotatably supported by an outer circumference of a boss portion of the differential case 36a of the front differential gear 36. A ring gear 38 of bevel gear type is fixed to a flange portion 32a formed at the rightward end of the outer rear wheel drive hub 32.

Further, a rotary front differential cover member 40 for covering the differential case 36a of the front differential gear 36 is fixed to the flange portion 32a of the outer rear wheel drive hub 32 with bolts 42 so as to enclose the front differential gear 36. The rightward end of the rotary cover member 40 is rotatably supported by a housing 12a of the transfer case 12 via a bearing 44.

A pinion gear 46 having a drive shaft 46a extending in the vehicle front and rear direction is in mesh with the ring gear 38. A propeller shaft (not shown) is fitted to a coupling 48 and fixed to the pinion gear shaft 46a. The pinion gear shaft 46a is rotatably supported via bearings 50 and 56 within a pinion housing 52 fixed to the housing 12a of the transfer case 12 with bolts 50.

Therefore, power distributed by the center differential case 26 is transmitted to a rear differential gear (not shown) by way of the outer rear wheel hub 32, the ring gear 38, the pinion gear 46 and the propeller shaft. The rear differential gear differentially distributes power to right and left rear wheels.

Figure 3:
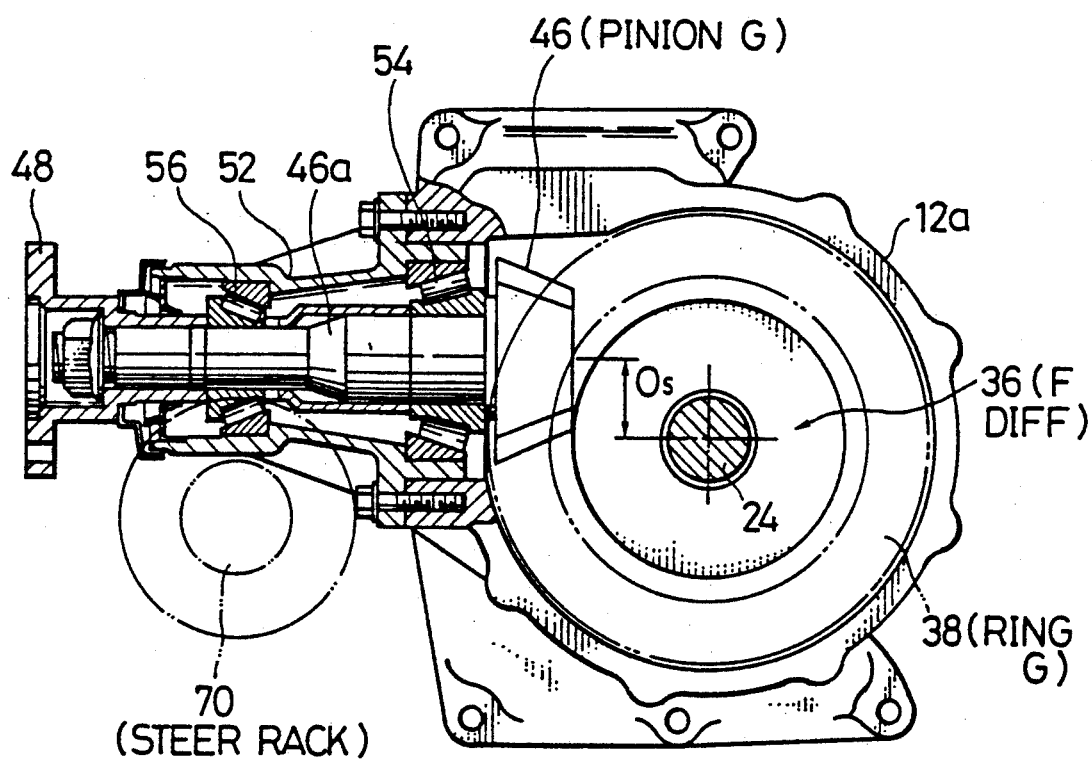
FIG. 3 is a cross-sectional, partially side view taken along the line D—D shown in FIG. 2.

In the above-mentioned construction, the pinion gear 46 is in mesh with the ring gear 38 in such a way that the central axis of the pinion gear 46 is offset by a distance $O_s$ upward away from the central axis of the ring gear 38, as shown in FIG. 3. To offset the pinion gear 46 from the ring gear 38, the teeth of the two gears 46 and 38 must be skewed, respectively because two apices of two circular cones of these two bevel gears 46 and 38 do not match with each other. As described above, it is possible to locate the pinion housing 52 for rotatably supporting the pinion gear 46 upward and therefore to locate a steering rack (shown by dot-dot-dashed line in FIG. 3) under the pinion housing 52.

Figure 4A:
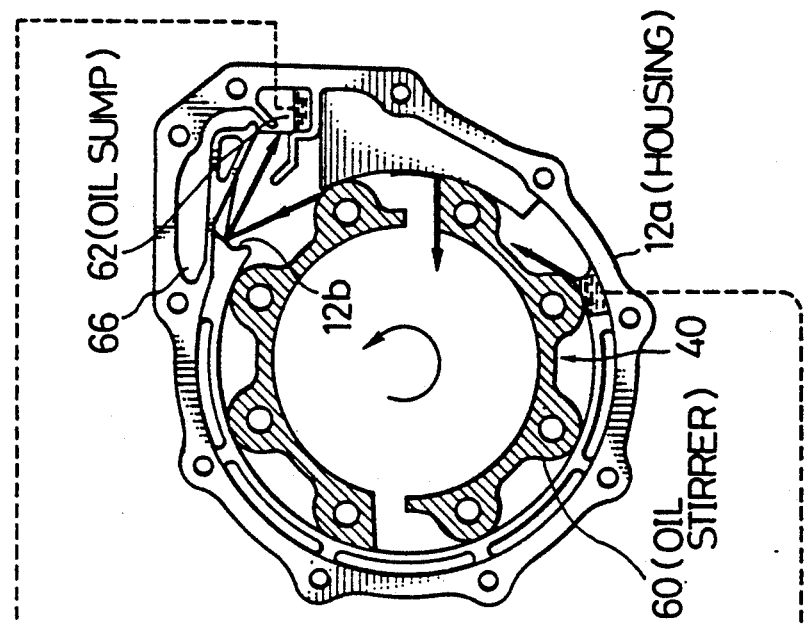
FIGS. 4(A), (B) and (C) are illustrations for assistance in explaining the flow of lubricant, in which FIGS. (A) and (B) are side (partially cross-sectional) views seen along the line A—A and B—B shown in FIG. 2, and FIG. (C) is a cross-sectional view taken along the lower part of the line D—D shown in FIG. 2.
Figure 4B:
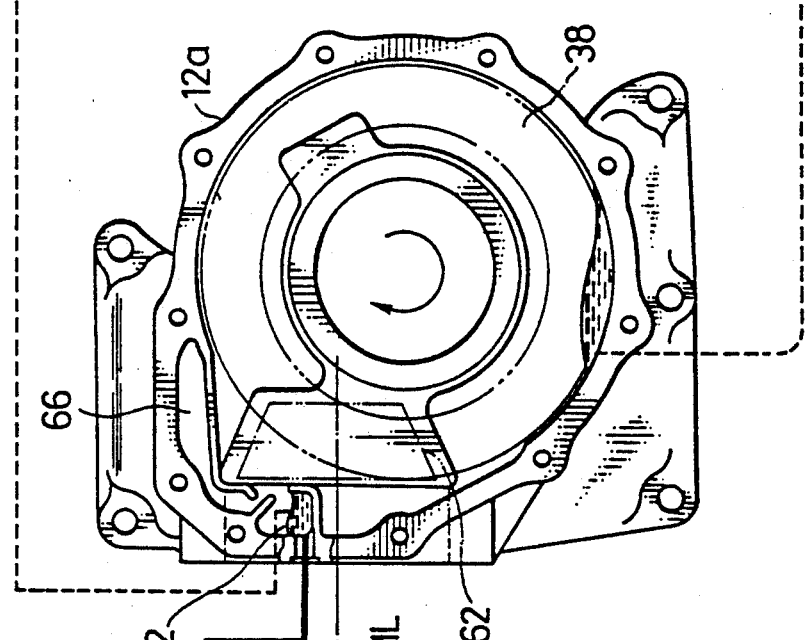
Figure 4C:
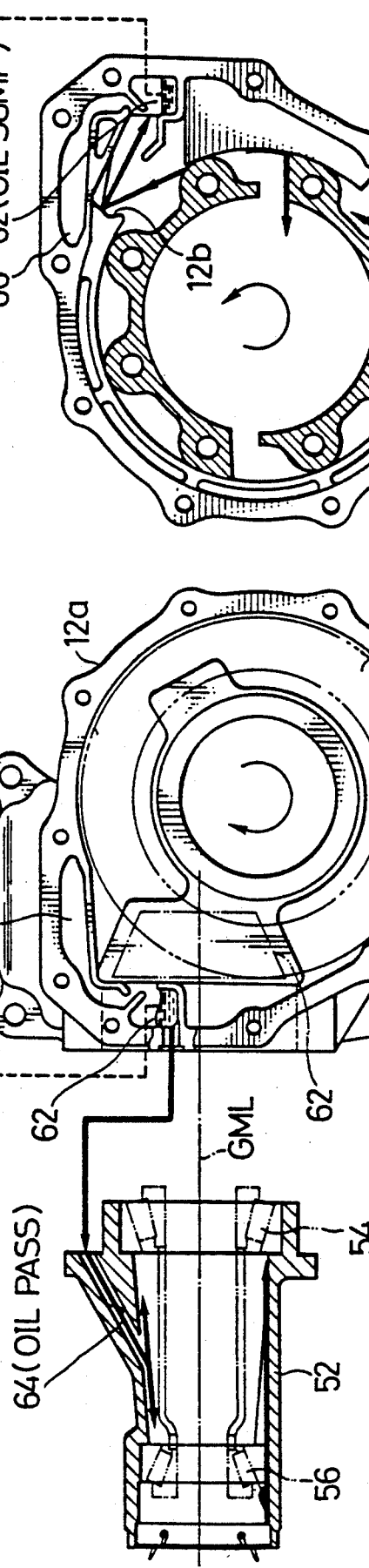

With reference to FIG. 2 and FIGS. 4(A), (B) and (C), the lubrication structure of the power transmission apparatus according to the present invention will be described hereinbelow. FIG. 4(A) is a side, partially cross-sectional view seen along the line A—A shown in FIG. 2; FIG. 4(B) is a side view seen along the line B—B shown in FIG. 2; and FIG. 4(C) is a cross-sectional view taken along the lower part of the line D—D shown in FIG. 2.

The rotary front differential cover member 40 fixed to the outer rear wheel drive hub 32 is formed with a lubricant stirring portion (oil stirrer) 60 in slidable contact with the inner circumference of the housing 12a of the transfer case 12. In more detail, the cover member 40 is formed with a plurality of projections 60 arranged at regular angular intervals, through which the cover member 40 is fixed to the flange portion 32a of the outer rear wheel drive hub 32 with bolts 42. The radially outermost end portions of these projections 60 are brought into slidable contact with the inner circumference of the housing 12a, in order to stir lubricant upward (e.g. counterclockwise). Therefore, when the outer rear wheel drive hub 32 rotates (e.g. counterclockwise), lubricant accumulated at the bottom of the housing 12a is stirred upward toward an inner oil guide wall 12b of the housing 12a and then guided into an oil sump 62 as shown in FIG. 4(A). That is, the projections 60 of the cover member 40 function as an oil pump or an oil stirrer. The lubricant once accumulated in the oil sump 62 partially drops again in the housing 12a from the oil sump 62, and further is supplied into the pinion housing 52 via an oil passage 64 formed in the pinion housing 52, as shown in FIG. 4(C). One end of the oil passage 64 communicates with the oil sump 62 and the other end of the oil passage 64 communicates with a middle position between the two bearings 54 and 56 for supporting the pinion gear 46. Here, in FIG. 4(C), although the inlet side of the oil passage 64 is shown, as an illustration, at a position higher than the position at which the oil sump 62 is shown, in practice the inlet side of the oil passage 64 is located at a position at least equal to or lower than the overflow portion of the oil sump 62. That is, the oil passage 64 is not formed at the uppermost portion of the pinion housing 52, as shown in FIG. 4(C). In other words, the oil sump 62 is provided at a position higher than the gear mesh position GML between the ring gear 38 and the pinion gear 46. The oil sump 62 is formed on the inner surface of the housing 12a of the transfer case 12 and near the two opposing and surfaces of two separatable case elements fixed by bolts 42 to constitute the housing 12a. Further, in FIGS. 4(A) and (B), a breathing chamber 66 is formed in the housing 12a so as to allow the oil sump 62 to communicate with the outside of the transfer case 12.

In the power transmission apparatus provided with the above-mentioned lubrication structure, since the rotative power around the vehicle right and left direction can be converted into that around the vehicle front and rear direction, by the rotary direction change gear assembly composed of the ring gear 38 fixed to the outer rear wheel drive hub 32 and the pinion gear 46 directly geared with the ring gear 38 (without interposing any spur gears), in order to transmit power distributed by the center differential gear 26 to the propeller shaft, it is possible to simplify the structure of the rotary direction change gear assembly.

Further, since the pinion gear 46 is geared with the ring gear 38 at an upward offset gear mesh position, it is possible to dispose the steering rack 70 under the pinion housing 52, so that the steering linkage and the steering knuckle can be located being flush with each other, in order to keep the front, wheel alignment at toe-in state at any vehicle travelling (bounding or rebounding) conditions, thus it being possible to improve the steering stability of the 4WD vehicle.

In addition, although the pinion gear 46 is offset upward away from the ring gear 38, since the front differential gear cover member 40 is formed with the oil stirring portion 60; since the transfer case housing 12a is formed with the oil sump 62; and since the pinion housing 52 is formed with the oil passage 64, it is possible to sufficiently supply lubricant once accumulated in the oil sump 62 by the oil stirring portion 60 to the bearings 54 and 56 for the pinion gear 46 via the oil passage 64, thus preventing the insufficient lubrication of the pinion gear 46 located upward away from the axis of the ring gear 38.

The power transmission apparatus according to the present invention has been disclosed in its preferred form by taking the case of a 4WD vehicle in which an engine is located on the vehicle front side along the vehicle transversal direction. Without being limited thereto, however, the apparatus of the present invention can be applied to a midship engine in which an engine is located at roughly the middle and along the longitudinal direction of a ship.

What is claimed is:

1. A power transmission apparatus for an automotive vehicle, comprising:
   (a) an apparatus housing;
   (b) a first front wheel drive hub extending in a first direction within said apparatus housing;
   (c) a second rear wheel drive hub disposed coaxially with said first drive hub;
   (d) a center differential gear housed within said apparatus housing, for differentially distributing power to said first and second hubs, respectively;
   (e) a drive shaft extending in a second direction perpendicular to the first direction and having an axis which is located laterally offset from and above an axis of said first and second drive hubs when the power transmission apparatus is mounted on the vehicle;
   (f) a steering rack being disposed under said drive shaft;
   (g) a rotary direction change mechanism including said drive shaft, for changing a rotative direction along said first and second hubs to another rotative direction along said drive shaft; and
   (h) lubricating means for supplying lubricant accumulated at a bottom of the apparatus housing to said rotary direction change mechanism.

2. The power transmission apparatus of claim 1, wherein said lubricating means comprises:
   (a) a rotary cover member coupled to any one of said first and second drive hubs and formed with at least one oil stirring portion for stirring lubricant accumulated at a bottom of the apparatus housing;
   (b) an oil sump formed inside the apparatus housing for accumulating lubricant stirred by said oil stirring portion of said rotary cover member;
   (c) an oil passage formed in a drive shaft housing for said drive shaft and being in communication with said oil pump, for supplying lubricant accumulated on said oil sump to said rotary direction change mechanism.

3. The power transmission apparatus of claim 2, wherein said oil stirring portion is a projection radially extending from said rotary cover member in slidable contact with the inner surface of said apparatus housing.

4. The power transmission apparatus of claim 2, wherein said oil passage communicates with a space between two opposing bearings for supporting said drive shaft within the drive shaft housing.

5. A power transmission apparatus for an automotive vehicle, comprising:
   (a) an apparatus housing;
   (b) a first front wheel drive hub extending in a first direction;
   (c) a second rear wheel drive hub disposed coaxially with said first drive hub;
   (d) a center differential gear for differentially distributing power to said first and second hubs, respectively;
   (e) a drive shaft extending in a second direction perpendicular to the first direction and having an axis which is located laterally offset from and above an axis of said first and second drive hubs when the power transmission is mounted on the vehicle;
   (f) a rotary direction change mechanism including said drive shaft, for changing a rotative direction along said first and second hubs to another rotative direction along said drive shaft; and
   (g) lubricating means for supplying lubricant accumulated at a bottom of the apparatus housing to said rotary direction change mechanism, said lubricating means including:
      (1) a rotary cover member coupled to any one of said first and second drive hubs and formed with at least one oil stirring portion for stirring lubricant accumulated at a bottom of the apparatus housing;
      (2) an oil sump formed inside the apparatus housing for accumulating lubricant stirred by said oil stirring portion of said rotary cover member;
      (3) an oil passage formed in a drive shaft housing for said drive shaft and being in communication with said oil sump, for supplying lubricant accumulated on said oil sump to said rotary direction change mechanism.

6. The power transmission apparatus of claim 5, wherein said oil stirring portion is a projection radially extending from said rotary cover member in slidable contact with the inner surface of said apparatus housing.

7. The power transmission apparatus of claim 5, wherein said oil passage communicates with a space defined between two opposing bearings which support said drive shaft within said drive shaft housing.

* * * * *